United States Patent [19]
Boegner et al.

[11] Patent Number: 5,586,433
[45] Date of Patent: Dec. 24, 1996

[54] PROCESS AND APPARATUS FOR SELECTIVE CATALYZED NO-REDUCTION IN OXYGEN-CONTAINING EXHAUST GASES

[75] Inventors: Walter Boegner, Remseck; Michael Kraemer, Notzingen; Bernd Krutzsch, Denkendorf; Guenter Wenninger, Stuttgart; Friedrich Wirbeleit, Esslingen; Werner Weisweiler, Remchingen, all of Germany

[73] Assignee: Daimler-Benz AG, Germany

[21] Appl. No.: 388,037

[22] Filed: Feb. 14, 1995

[30] Foreign Application Priority Data

Feb. 14, 1994 [DE] Germany ............... 44 04 617.0

[51] Int. Cl.⁶ .................................................. F01N 3/36
[52] U.S. Cl. .............................. 60/274; 60/286; 60/295; 60/301; 60/303
[58] Field of Search .................... 60/274, 286, 295, 60/301, 303; 423/213.2, 213.5, 239.2, 248

[56] References Cited

U.S. PATENT DOCUMENTS

| | | | |
|---|---|---|---|
| 3,118,727 | 1/1964 | Cohn | 423/239.1 |
| 3,631,843 | 1/1972 | Yeiser | 123/497 |
| 3,986,350 | 10/1976 | Schmidt | 60/301 |
| 5,007,381 | 4/1991 | Kakegawa et al. | 123/3 |
| 5,189,876 | 3/1993 | Hirota et al. | 60/303 |
| 5,243,819 | 9/1993 | Woerner et al. | 60/286 |
| 5,412,946 | 5/1995 | Oshima et al. | 60/301 |

FOREIGN PATENT DOCUMENTS

| | | |
|---|---|---|
| 4221363A1 | 1/1993 | Germany . |
| 4-83516 | 3/1992 | Japan . |

Primary Examiner—Leonard Heyman
Attorney, Agent, or Firm—Evenson, McKeown, Edwards & Lenahan P.L.L.C.

[57] ABSTRACT

A process and apparatus for the selective catalyzed $NO_x$ reduction in oxygen-containing exhaust gases of internal-combustion engines. For improving the reduction of nitric oxides, hydrocarbons and air are supplied to the exhaust gas purifier and, for producing reactive short-chained unsaturated hydrocarbons, a defined quantity of fuel from the stored fuel intended for the fuel supply of the internal-combustion engine is catalytically cracked and is oxidized by the simultaneous supply of air. The resulting species are guided into the exhaust gas flow of the exhaust gases which are to be purified.

10 Claims, 1 Drawing Sheet

PROCESS AND APPARATUS FOR SELECTIVE CATALYZED NO-REDUCTION IN OXYGEN-CONTAINING EXHAUST GASES

BACKGROUND AND SUMMARY OF THE INVENTION

The present invention relates to a process and apparatus for selective catalyzed $NO_x$-reduction in oxygen-containing exhaust gases, in which, for improving the reduction of nitric oxides, hydrocarbons and air are supplied on the upstream side of an exhaust gas purifier.

In the future, extremely strict nitric oxide limit values will apply to diesel internal-combustion engines in addition to very low particle limit values. It will be extremely difficult to maintain these extremely strict nitric oxide limit values only by measures within the engine.

It is known that, in the case of conventional selective catalyzed reduction processes, ammonia is used as a selective reducing agent for nitric oxides. As an alternative, aqueous urea solutions have also been suggested which, however, just like ammonia, because of an ammonia slip, may result in problems in the case of a transient engine operation.

In the case of vehicles, solutions which use hydrocarbons for the post-engine nitric oxide reduction are deemed more advantageous.

DE 42 21 363 A1 describes an exhaust gas purification process arrangement which comprises a feeding system for liquid hydrocarbons made available in a liquid-hydrocarbon storage tank as well as a feeding system for feeding compressed air. A spray-in device, which is situated in the flow path of the exhaust gas upstream of an exhaust gas purifier, sprays in the liquid hydrocarbon after the guiding-together with the compressed air into the flow of the exhaust gas.

An object of the present invent-ion is to improve the aforementioned process and simplify an arrangement for implementing that process without any impairment of a maximally achievable $NO_x$-conversion in the $NO_x$-exhaust gas purifier.

This object has been achieved according to the present invention by providing that the metering pipe and an air pipe are connected to the cracked catalyst controllable as function of temperature, and the catalytically cracked defined fuel quantity is oxidizable by simultaneously supplied air, and a supply pipe leading into the exhaust pipe for supplying resulting reactive species being to exhaust gas flow upstream of the exhaust gas purifier and the cracked catalyst is configured to be electrically heatable and controllable in a temperature range between 200°–700° C.

By the arrangement of a cracked catalyst, via which a portion of the fuel provided for the fuel supply of the internal-combustion engine is guided, and by the simultaneous blowing of air into this cracked catalyst, highly effective hydrocarbons are produced which have a high $NO_x$ reduction potential.

Such measures have the advantage of using the fuel, which is carried in the vehicle anyhow, also for the $NO_x$-reduction. Therefore, no additional tank is required for the storage of hydrocarbons.

In addition to the partial oxidation of the hydrocarbons, the air blown into the cracked catalyst also causes a periodically implemented purification of the coke-susceptible cracked-catalyst surface in a highly oxidizing atmosphere; for example, at $\lambda>1$ and a temperature in the Denox-catalyst which is higher than 500° C.

The use of a pressure accumulator in the feeding pipe, in which gaseous hydrocarbons are stored, according to the need and requirements, permits a metered addition of gaseous hydrocarbons into the exhaust gas flow of the internal-combustion engine for the optimal $NO_x$-reduction in the exhaust gas purifier.

BRIEF DESCRIPTION OF THE DRAWING

These and other objects, features and advantages of the present invention will become more readily apparent from the following detailed description thereof when taken in conjunction with the accompanying drawing wherein.

DETAILED DESCRIPTION OF THE DRAWING

Figure 1:
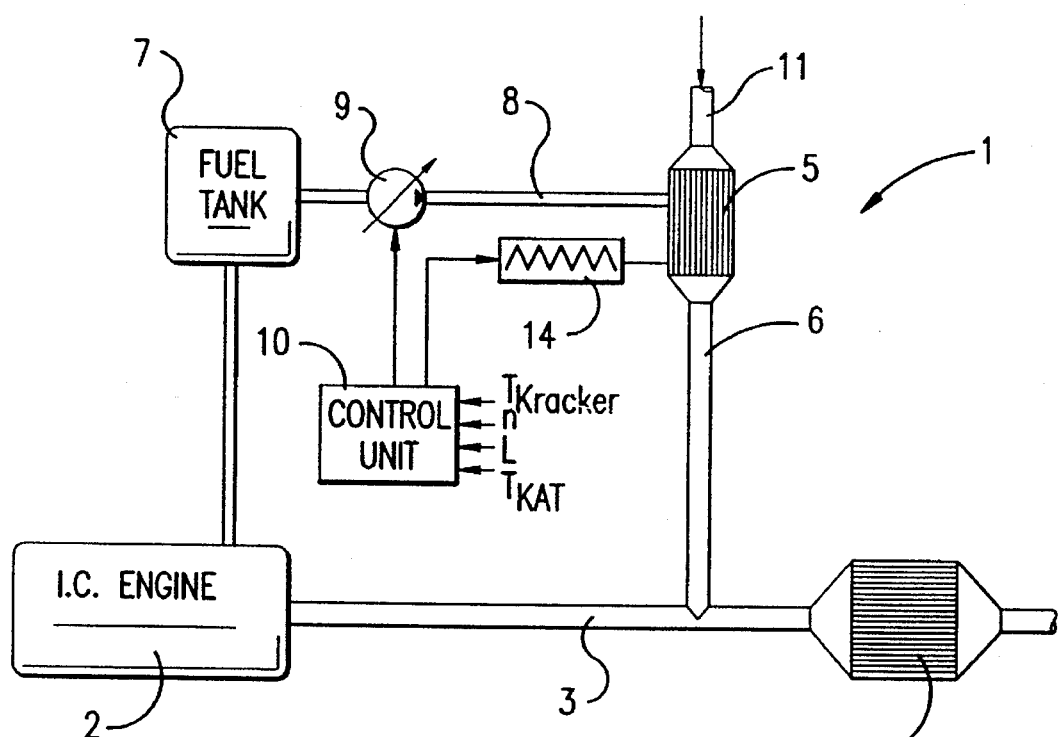
FIG. 1 is a schematic view of an exhaust system for an internal combustion engine having an apparatus for selective catalyzed $NO_x$-reduction in accordance with the present invention.

An exhaust system designated generally by numeral 1 for an internal-combustion engine 2 operated with diesel fuel comprises an exhaust gas purifier 4, such as a Denox-catalyst, which is arranged in an exhaust pipe 3, as well as a cracked catalyst 5 in a feeding pipe 6 which leads into the exhaust pipe 3 upstream of the exhaust gas purifier 4. The cracked catalyst 5 consists of active constituents, predominantly zeolite, which may be applied to a carrier.

A conventional tank 7 with fuel for the fuel supply of the internal-combustion engine 2 is connected with a metering pipe 8 which contains a metering pump 9 to meter out to the cracked catalyst 5 an appropriate amount of fuel via a control unit 10 so that an HC—$NO_x$ ratio of between 0 and 5 is ensured on the Denox-catalyst 4 also at a full load and a rotational speed at maximum power. In addition to the fuel, a predetermined amount of air shown by the arrow is blown by way of an air pipe 11, into the cracked catalyst 5 which, when air and fuel are guided together, is operated at an understoichiometric air ratio of $\lambda=0$ to 0.2. The fuel is catalytically cracked and the produced reactive short-chained unsaturated hydrocarbons as well as partially oxidized hydrocarbons are supplied to the exhaust gas flow on the upstream side of the Denox-catalyst for the targeted $NO_x$-reduction.

Figure 2:
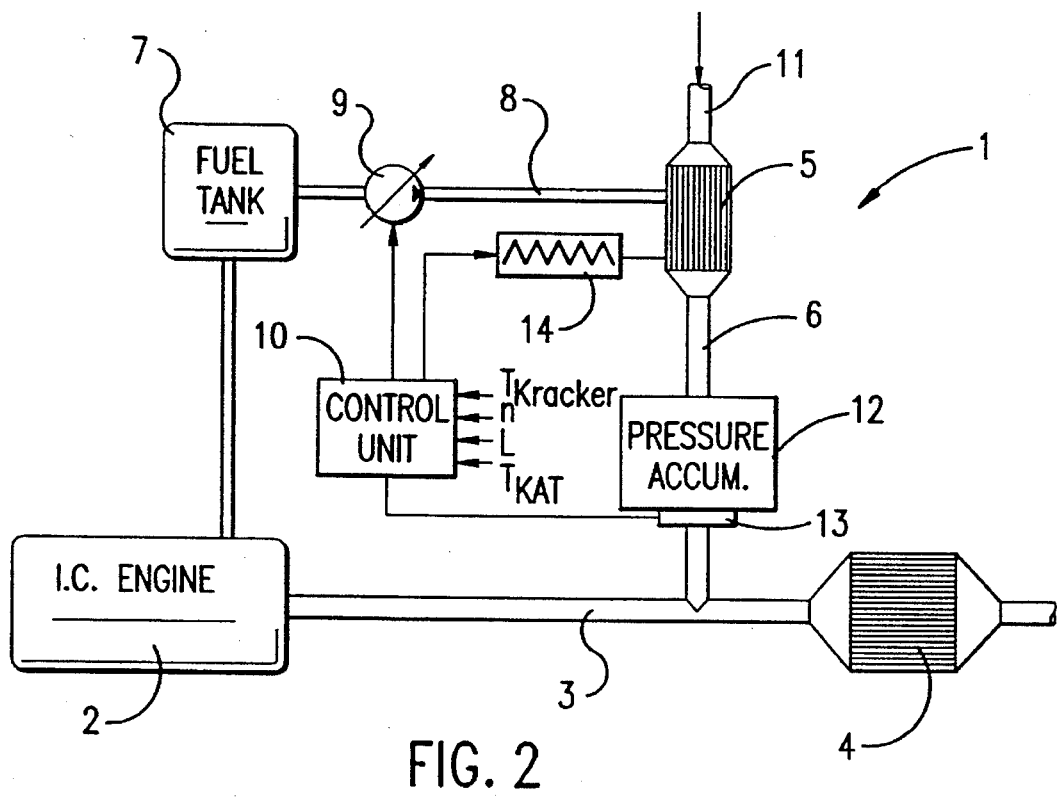
FIG. 2 is a schematic view similar to FIG. 1 but with a metering valve provided in a pressure accumulator.

Optionally, a pressure accumulator 12 with a characteristic-diagram-controlled metering valve 13 (illustrated by FIG. 2) can be provided in the feeding pipe 6. The metering valve 13 meters from the control unit 10, as a function of the operating parameters, the hydrocarbon amount to the exhaust gas purifier 4 depending on the requirement in order to achieve an optimal $NO_x$-production. The operating parameters may, for example, mainly be the rotational speed n, the load L and also conceivably the Denox-catalyst temperature.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An arrangement for selective catalyzed $NO_x$-reduction in oxygen-containing exhaust gases of a diesel internal-combustion engine, comprising an exhaust pipe operatively connected with the engine, an exhaust gas purifier arranged in the exhaust pipe, a fuel tank operatively connected with an engine intake of the engine, a cracked catalyst in fluid communication with the exhaust pipe upstream of the exhaust gas purifier and thermally isolated from a flow of exhaust gas from the engine, an air pipe operatively associated with the cracked catalyst, a metering pipe operatively arranged between the fuel tank and cracked catalyst, a motoring pump arranged in the metering pipe to meter diesel fuel stored in the fuel tank to the cracked catalyst, wherein a defined fuel quantity from the stored fuel is catalytically cracked to produce a substantial portion of short-chained unsaturated hydrocarbons, and the defined fuel quantity is oxidizable by air simultaneously supplied thereto from the air pipe, and a supply pipe provides the fluid communication between the exhaust pipe and the cracked catalyst for supplying in metered amounts the short-chained unsaturated hydrocarbons to the exhaust gas upstream of the exhaust gas purifier for purifying the exhaust gas.

2. The arrangement according to claim 1, wherein means is provided for electrically heating the cracked catalyst in a temperature range between 200°–700° C.

3. The arrangement according to claim 1, wherein, a control unit is operatively arranged to provide a metered quantity of fuel to the cracked catalyst such that an HC—$NO_x$ mol ratio approximately between 0 and 5 is obtained for the exhaust gas purifier configured as a Denox-catalyst.

4. The arrangement according to claim 1, wherein the cracked catalyst is configured to be operable by one of an understoichiometric fuel-air ratio of between 0 and 0.2 and by an fuel-air ratio greater than 1.

5. The arrangement according to claim 1, wherein, a pressure accumulator is arranged downstream of the cracked catalyst and has a characteristic-diagram-controlled metering valve configured to meter the hydrocarbon quantity required for the exhaust gas purifier.

6. A process for selective catalyzed $NO_x$-reduction in oxygen-containing exhaust gases of a diesel internal combustion engine, comprising the steps of supplying air and fuel from a fuel source which separately provides diesel fuel to the engine to a catalyst cracker in fluid communication with the exhaust gases and thermally isolated from a flow of the exhaust gases from the engine, catalytically cracking a defined quantity of the fuel and oxidizing the catalytically cracked fuel to obtain a substantial portion of short-chained hydrocarbons, and passing the short-chained hydrocarbons from the catalyst cracker into a flow of exhaust gases upstream of an exhaust gas purifier.

7. The process according to claim 6, wherein the catalytic cracking is conducted in a temperature range between 200°–700° C.

8. The process according to claim 6, wherein the defined quantity of stored fuel is metered such that an HC—$NO_x$ mol ratio between about 0 and 5 is obtained for the exhaust gas purifier.

9. The process according to claim 6, wherein the catalytic cracking is conducted with a fuel-air ratio of between greater than 0 and 0.2.

10. The process according to claim 6, wherein the catalytic cracking is conducted with an overstoichiometric fuel-air ratio of greater than 1.

* * * * *